July 29, 1930.　　D. RÖNNBERG ET AL　　1,771,421

OPERATING MECHANISM FOR CIRCUIT BREAKERS

Filed Sept. 24, 1929

Inventors
Daniel Rönnberg and
Adolf Rooth.
per Wm Wallace White

Patented July 29, 1930

1,771,421

UNITED STATES PATENT OFFICE

DANIEL RÖNNBERG AND ADOLF BOOTH, OF LUDVIKA, SWEDEN, ASSIGNORS TO ALLMÄNNA SVENSKA ELEKTRISKA AKTIEBOLAGET, OF VASTERAS, SWEDEN, A CORPORATION OF SWEDEN

OPERATING MECHANISM FOR CIRCUIT BREAKERS

Application filed September 24, 1929, Serial No. 394,775, and in Sweden September 26, 1928.

The present invention relates to operating mechanism for circuit-breakers of the type in which a spring is compressed by hand or by means of a motor and closes the circuit-breaker in being expanded. The opening of the circuit-breaker is on the contrary effected by so-called free release, independent of the closing mechanism. In the devices of this kind hitherto used, the spring has been connected to the driving mechanism by an arrangement which is disconnected at the closing operation so that only the spring, the circuit-breaker contacts and the intermediate members have been in motion on this occasion. This has however frequently been found to cause the inconvenience of too hard a shock at the closing operation which may cause the risk of damaging the contacts.

According to the present invention, the spring is permanently connected with the mechanism for its compression, said mechanism comprising among other members a helical gearing having a pitch angle greater than the friction angle so as not to be self-locking. This gearing is thus brought in motion by the spring during the closing operation so as to exert a damping action on the shock which otherwise would occur. Other items of the invention will appear in the following detailed description thereof.

Figure 1:
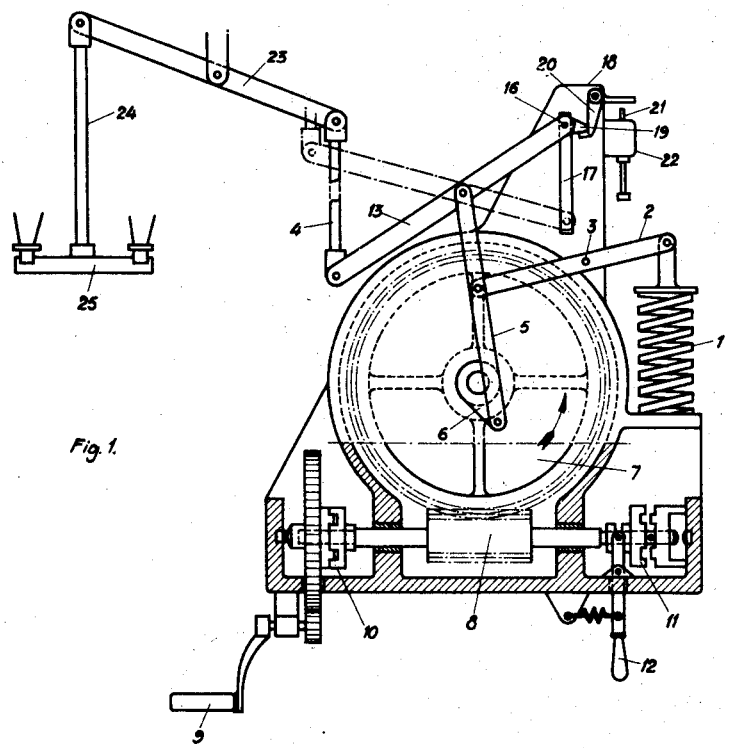
Figure 2:
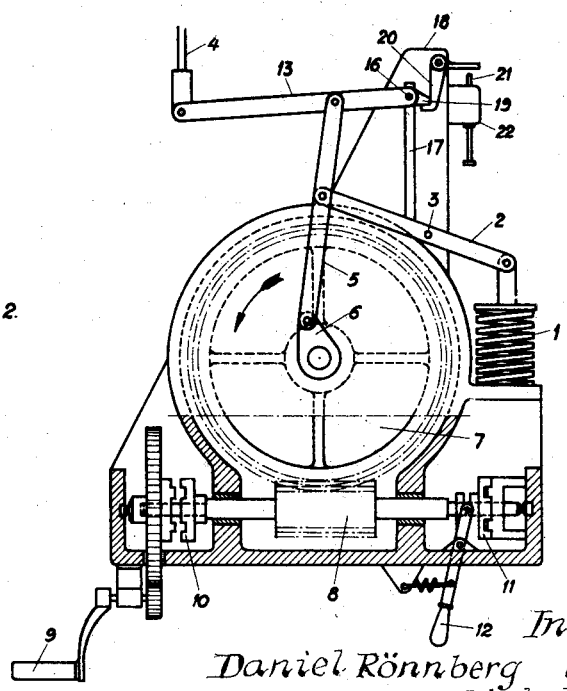

A form of the invention is illustrated in the accompanying drawing where Fig. 1 shows the same in a side view, partially in section, in the position corresponding to closed circuit-breaker, some of the parts being shown in dash and dotted lines in another position. Fig. 2 shows the principal mechanism according to Fig. 1 in a corresponding view, with the parts in the state ready for closing the circuit-breaker.

The spring 1 is by means of a lever 2 movable on a pivot 3 connected with the mechanism for operating the circuit-breaker contacts and with a crank mechanism consisting of a link 5 and a crank 6. The latter is mounted on the same shaft as a gear wheel 7 in which engages a screw 8. The pitch angle of the screw is larger than the angle of friction so that the gearing will not be self-locking.

For compressing the spring 1 the screw gearing is rotated by appropriate driving means for instance a crank 9 so as to cause the gear wheel 7 to rotate in the direction of the arrow from the position shown in Fig. 1 to that shown in Fig. 2. In the latter position, in which the crank has moved a little over its top point, it is then locked for instance by means of a device described below if the circuit-breaker shall not be closed at once. When the closing shall be effected the gear wheel is allowed to continue its movement in the direction of the arrow to about the position shown in Fig. 1. The spring is then expanded and closes the circuit-breaker, the motion of the mechanism being retarded by the gearing so as not to cause a too heavy shock at the contacts.

The mechanism for operating the circuit-breaker contacts from the lever 2, including the mechanism for free release of the said contacts, in the form shown comprises the following parts. The link 5 has an extension which is connected to a double lever 13 near the centre thereof. One end of this lever is by means of a rod 4 connected to another lever 23 which in its turn is connected, by means of an insulating rod 24, to the movable contacts 25 of the circuit-breaker. The other end of the lever 13 carries a stud 16 which is guided in a groove 17 in the stationary frame 18 of the apparatus. Further it has a projection 19 which is caught by a corresponding projection on a bell-crank lever 20 and can be released by means of a stud 21 forming the movable part of a relay 22. When the bell-crank lever is released in this way, the end of the lever 13 carrying the stud 16 is moved downwards along the groove 17, and the circuit-breaker is then opened notwithstanding that the crank 6 and link 5 still occupy their closing position. The position of the lever 13 and rod 4 after this movement is shown in dash and dotted lines in Fig. 1.

The screw 8 is preferably somewhat displaced in its longitudinal direction and connected to two disengaging couplings 10, 11. The coupling 10 which is engaged when the screw is moved to the left in the drawing connects it to the driving means 9 while the coupling 11 which is engaged at a displacement in the opposite direction connects the screw either to a fixed part or to a disc or the like influenced by a brake. During the movement for compressing the spring 1, when the tooth pressure from the gear wheel acts on the screw towards the left, the coupling 10 is kept in engagement so that the screw is connected to the driving means 9. When the crank mechanism 5, 6 passes its top point, the direction of the tooth pressure is reversed whereby the coupling is disengaged and the coupling 11 instead engaged, so that the gearing 6 stops in the position shown in Fig. 2. In order to release the spring and thus close the circuit-breaker, the coupling 11 can then be disengaged by means of a hand lever 12.

We claim as our invention:

1. Operating mechanism for circuit-breakers comprising movable contacts, a compressible spring, means connecting together said contacts and spring so as to close the contacts on the expansion of the spring, and means for compressing the spring comprising a helical gearing permanently connected to said spring and having its pitch angle greater than the angle of friction.

2. Operating mechanism for circuit-breakers comprising movable contacts, a compressible spring, means connecting together said contacts and spring so as to close the contacts on the expansion of the spring, and means for compressing the spring comprising a crank mechanism and a helical gearing having its pitch angle greater than the angle of friction and connected to said spring by said crank mechanism.

3. Operating mechanism for circuit-breakers comprising movable contacts, a compressible spring, means connecting together said contacts and spring so as to close the contacts on the expansion of the spring, means for compressing the spring comprising a crank mechanism, a helical gear wheel having its pitch angle greater than the angle of friction, a screw engaging said wheel and displaceable in its longitudinal direction under the gear pressure and a coupling connecting said screw to driving means when displaced in one direction, and another coupling connecting said screw to stopping means when displaced in the opposite direction.

4. Operating mechanism for circuit-breakers comprising movable contacts, a compressible spring, means connecting together said contacts and spring so as to close the contacts on the expansion of the spring, means for compressing the spring comprising a crank mechanism, a helical gear wheel having its pitch angle greater than the angle of friction, a screw engaging said wheel and displaceable in its longitudinal direction under the gear pressure and a coupling connecting said screw to driving means when displaced in one direction, another coupling connecting said screw to stopping means when the screw is displaced in the opposite direction, and means for disengaging said latter coupling by hand.

In testimony whereof we have signed our names to this specification.

DANIEL RÖNNBERG.
ADOLF ROOTH.